United States Patent [19]

Schilling

[11] 4,355,710
[45] Oct. 26, 1982

[54] SPRING ENGAGED FLUID RELEASED FAN CLUTCH FOR A LIVE SHAFT

[75] Inventor: Hugh K. Schilling, St. Paul, Minn.

[73] Assignee: Horton Industries, Inc., Minneapolis, Minn.

[21] Appl. No.: 180,846

[22] Filed: Aug. 25, 1980

[51] Int. Cl.³ .................... F16D 13/44; F16D 25/063
[52] U.S. Cl. .............................. 192/91 A; 192/82 T; 192/85 A
[58] Field of Search ............... 192/91 A, 82 T, 85 A; 188/170

[56] References Cited

U.S. PATENT DOCUMENTS

| | | | |
|---|---|---|---|
| 1,300,898 | 4/1919 | Vincent | 192/85 A |
| 2,575,765 | 11/1951 | Nabstedt et al. | 192/91 A |
| 2,684,742 | 7/1954 | Eason | 192/91 A |
| 2,698,676 | 1/1955 | Eason | 188/170 |
| 2,865,481 | 12/1958 | De Teramala | 192/91 A |
| 3,145,816 | 8/1964 | De Lorean et al. | 192/91 A |
| 3,684,397 | 8/1972 | Elmer | 192/91 A |
| 4,057,297 | 11/1977 | Beck et al. | 188/170 X |
| 4,238,017 | 12/1980 | Spokas | 192/91 A X |
| 4,245,724 | 1/1981 | Beck | 192/91 A X |

Primary Examiner—Rodney H. Bonck
Attorney, Agent, or Firm—Wicks & Nemer

[57] ABSTRACT

A spring engaged fluid released fan clutch is disclosed. A sheave connected to a live shaft is connected to rotate with a friction disc. Encompassing the friction disc and rotatable relative thereto is an outer shell portion carrying fan blades. Connected for rotation with the outer shell portion and rotatably mounted on the friction disc is a cylinder plate. An annular piston, having a friction facing, is slidably mounted on a hub provided internally of the outer shell portion and is connected to rotate with the shell portion. Springs urge the piston with its friction facing into engagement with the friction disc to engage the clutch. Fluid pressure is introduced through the hub of said outer shell portion and into a cavity between the cylinder plate and the piston urging the piston away from the friction disc against the action of the springs to disengage the clutch.

11 Claims, 3 Drawing Figures

SPRING ENGAGED FLUID RELEASED FAN CLUTCH FOR A LIVE SHAFT

SUMMARY

The invention relates to an improvement in clutches and more particularly to a spring engaged fluid released fan clutch for a live shaft.

It is an object of the invention to provide a spring engaged fluid released fan clutch with which the fan load is substantially centered over a support bearing, and the clutch is mounted on a live shaft as compared to a conventional mounting on a stationary shaft. It is a further object to provide a clutch having construction which provides structural integrity by means of an encompassing totally enclosed outer shell as opposed to a conventional thru-the-center hub/shaft arrangement.

In the drawings forming part of this application:

FIG. 3 is a sectional view on the line 3—3 of FIG. 2.

Figure 1:
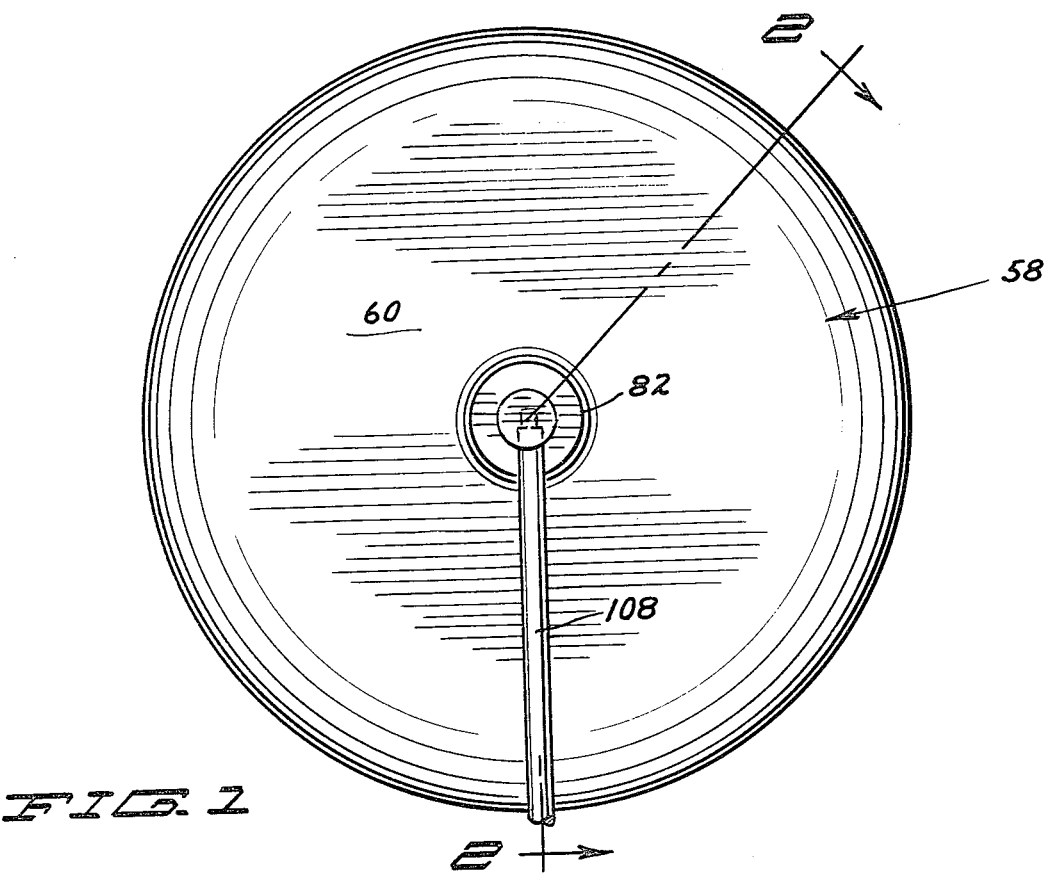
FIG. 1 is an end view of a spring engaged fluid released fan clutch embodying the invention.

Referring to the drawings in detail, the clutch A includes the circular mount 10 including the annular flange 12 having a multiplicity of spaced holes 14 for bolting the mount to the sheave S by means of bolts 15. A driven member in one form of the sheave S is secured to the live stub shaft 16 rotated by conventional mechanism (not shown) within the engine block B whereby the sheave and mount are rotated. The flange 12 terminates radially inwardly in the hollow hub portion 18 formed with splines 20 thereon.

The numeral 22 designates a friction disc having the circular main body portion 24 with the annular offset portion 26 terminating in the friction engageable annular foot portion 28. The body portion 24 of the disc 22 is formed with the axial hollow hub 30 having internal splines 32 in engagement with the splines 20 of hub portion 18. The mount 10 is secured in splined relationship to the body portion 24 of the friction disc 22 by means of the axially mounted bolt 34 extended through the wall 18 of hub 18' and in threaded engagement with the body portion 24.

The hub 30 is formed with an external annular recess 36, and the hub 18 is formed with a companion annular recess 38 which recesses receive the inner race 40 in press fit of support bearing 42. The outer race 44 is press fit in the annular recess 46 of the annular hub 48 of the circular body portion 50 of the first outer shell section 52. The outer periphery of the body portion 50 terminates in the offset annular portion 54 which in turn terminates in the offset annular flange 56.

The numeral 58 designates a second shell section—including the central circular body portion 60 on the outer periphery of which is formed the annular flange 62 in alignment with the annular flange 56 of shell section 52. The flanged sections are joined by means of a series of spaced bolts 64. Formed internally and axially of the body portion 60 is the hollow hub 66 having the annular recess 68 with the inner wall 70 formed with the axial hole 72 in which the bushing 74 is positioned.

Positioned in the bushing 74 is the reduced inner end portion 76 of the central rotary air union member 78. The end portion 76 terminates in the larger diameter central portion 80 which in turn terminates in the larger outer end portion 82. Mounted on the central portion 80 is the bearing 84 with the bearing in the recess 68. A lock ring 86 mounted on the central portion 80 holds the bearing 84 against the end portion 82. Adjacent the inner wall 70 is the ring 88 formed with an outer annular recess 90 for the O-ring 92 which makes sealing engagement with the recess 68. The ring 88 is also formed with the inner annular recess 94 in which is positioned the O-ring 96 which makes sealing engagement with the end portion 76 of the air union member 78. Adjacent the ring 88 is the ring 98 which has the inner annular recess 100 in which is mounted the O-ring 102 which makes sealing contact with the end portion 76 of the air union member 78. The ring 98 is positioned between the ring 88 and the central portion 80. The air union member 78 has formed therethrough the axial hole 104 which connects with the transverse hole 106 to which is connected the fluid pressure flexible supply hose 108.

The numeral 110 designates an annular piston having an axial hole 111 in which is slideably mounted the hub 66, and in the inner edge thereof is formed a recess 112 in which is mounted the O-ring 114 for sealing engagement with the hub 66. The outer peripheral portion of the piston is formed with a series of spaced recesses 116 each of which has a coil spring 118 mounted therein with the outer end of the spring positioned against the inner surface of the shell body portion 60 thereby normally urging the piston from the shell.

Extending from the piston adjacent the recesses 116 is the annular flange 120, and secured to the piston 110 opposite the recesses 116 is the friction facing ring 122.

Further provided is the disc-like cylinder plate 124 formed with the axial recess 126 in which is positioned the bushing 127 with the stub 128 of the friction disc 24 within the bushing. The outer edge of the cylinder plate 124 is formed with the recess 130 in which is positioned the O-ring 132 for sliding sealing engagement with the inner circular surface 134 of the annular flange 120 of the piston 110. The cylinder plate 124 is connected to the hub 66 of shell section 58 by means of a series of bolts 125.

The piston 110 is pinned to the outer shell body portion 60 by means of a series of spaced pins 136 extending into holes 138 of the body 60 and the bushings 138 in the holes 140 of the piston 110. Secured to the annular flange 56 of the hub 48 is a multiplicity of spaced fan blades 142 by means of a bolt 144.

Figure 2:
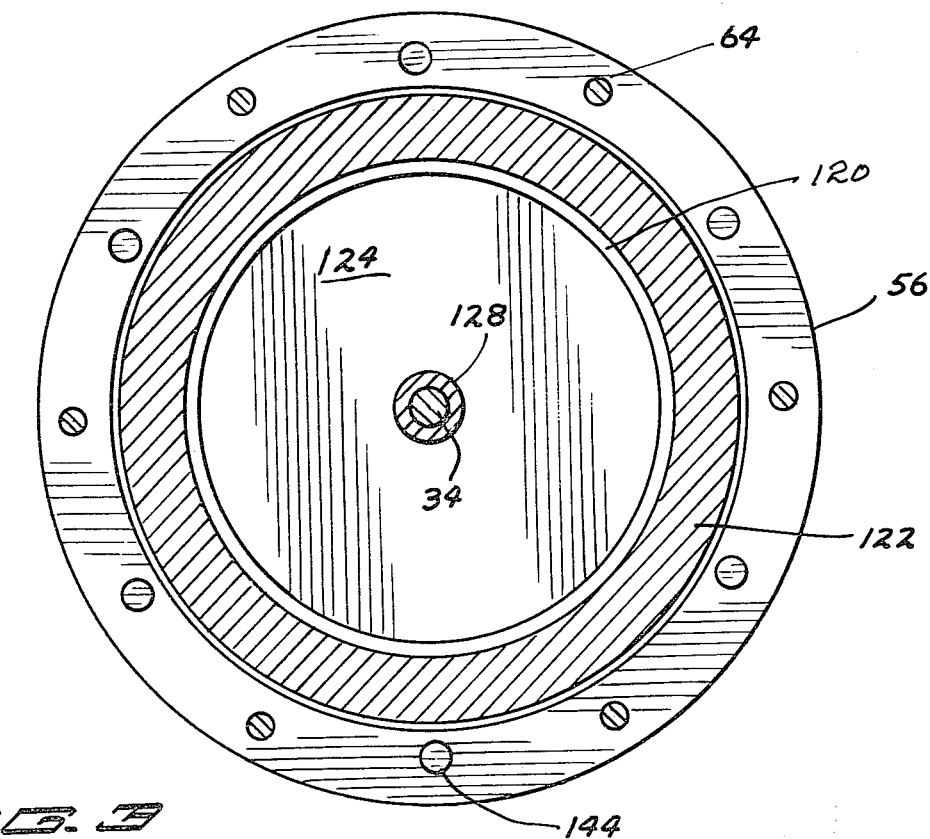
FIG. 2 is sectional view on the line 2—2 of FIG. 1.
Figure 2:
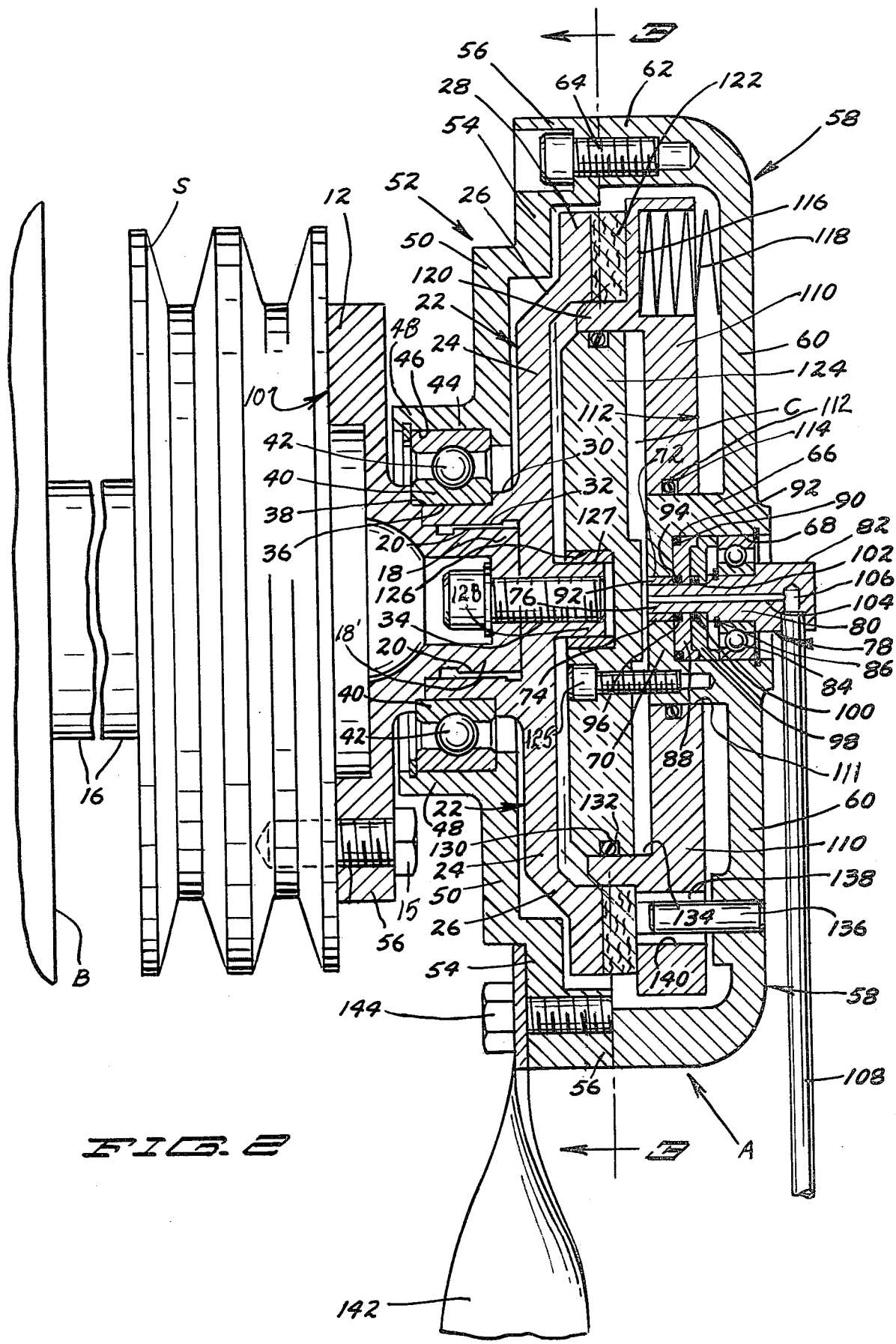

In FIG. 2 the clutch is spring engaged with the annular foot 28 of friction disc 22 in engagement with the friction facing ring 122 of annular piston 110. With the sheave S rotating as live by means of the power source through live shaft 16 the hub 18 of the mount 10 rotates the disc 22 the flange foot 28 of which contacts friction facing 122 whereby the piston 110 rotates with the friction disc 22 together with the shell section 58 pinned to the piston and the cylinder plate 124 also rotates due to a series of spaced bolts 125 connecting the cylinder plate to the hub 66. With the outer housing 58 pinned to the piston 110, the housing 58 also rotates thereby rotating the blades 142 thereon, the rotary air union remaining stationary. When fluid pressure is introduced through line 108 to axial hole 104 and thence to the cylinder cavity C between piston 110 and cylinder plate 124 the friction facing ring 122 is separated from the annular foot 28. As a result the shell section and fan blades 142 thereon are not driven but windmill freely. The fluid pressure is turned totally off and on by means of an external temperature sensor and valve and as a result there is no slippage of the friction surfaces which would generate heat.

Having thus described the invention, what is claimed as new and desired to be secured by Letters Patent is:

1. A spring engaged fluid released fan clutch for a live shaft comprising:
   (a) a sheave for connection with a live shaft,
   (b) means connecting said sheave to a friction disc,
   (c) a first outer shell portion,
   (d) means rotatably mounting said first outer shell portion on said connecting means,
   (e) a second outer shell portion connected to said first outer shell portion,
   (f) an annular piston, having a friction facing mounted thereon,
   (g) means slidably mounting said piston on a hub connected to and within said second outer shell portion,
   (h) a cylinder plate spaced from said piston and forming a cylinder cavity therebetween,
   (i) means rotatably mounting said cylinder plate on said friction disc,
   (j) means connecting said hub of said second outer shell with said cylinder plate,
   (k) means rotatably mounting said second outer shell portion on fluid introducing means,
   (l) fan blades connected to said first shell portion, radially and directly adjacent of said means rotatably mounting said first outer shell,
   (m) a multiplicity of springs,
   (n) means mounting said springs on said piston in pressure contact with said second outer shell portion thereby urging said friction facing on said piston into pressure contact with said friction disc whereby said shell portions and said blades thereon rotate with said sheave,
   (o) means for supplying fluid pressure to said fluid introducing means and into said cylinder cavity whereby said piston is moved from said cylinder plate and said friction facing thereon is moved out of contact with said friction disc against the urging of said spring whereby said shell portions and fan blades thereon cease to rotate.

2. The device of claim 1 in which said means connecting said sheave to a friction disc includes a hub carried by said sheave in radial alignment with said means rotatably mounting said first outer shell portion on said connecting means and connected to said friction disc axially thereof.

3. The device of claim 2 in which said means rotatably mounting said first outer shell portion on said connecting means is a bearing.

4. The device of claim 2 in which said piston is interposed between said second outer shell portion and said cylinder plate.

5. The device of claim 2 in which said means slideably mounting said piston on and within said second outer shell portion includes
   an opening formed axially in said annular piston in which said hub of said second outer shell is mounted.

6. The device of claim 1 in which said means rotatably mounting said first outer shell portion on said connecting means is a bearing in radial alignment with said connecting means.

7. The device of claim 1 in which said piston is interposed between said second outer shell portion and said cylinder plate.

8. The device of claim 1 in which said means slideably mounting said piston on and within said second outer shell portion includes
   an opening formed axially in said annular piston in which said hub of said second outer shell is mounted.

9. The device of claim 1 in which said means rotatably mounting said cylinder plate on said friction disc includes
   (a) a stub formed axially on said friction disc rotatable within
   (b) a recess formed axially in said cylinder plate.

10. A spring engaged fluid released fan clutch for a live shaft,
    (a) a sheave for connection with a live shaft,
    (b) a first hub carried by said sheave,
    (c) a first outer shell section having a second hub,
    (d) a friction disc having third hub connected to said first hub,
    (e) a single support bearing mounted between said second hub and said third hub,
    (f) said first outer shell section including a circular body extending radially outwardly from said second hub thereof and positioned axially directly adjacent said support bearing,
    (g) a multiplicity of fan blades connected to said circular body portion of said first outer shell section,
    (h) a second outer shell section connected to said first outer shell section,
    (i) said second outer shell section having a hollow hub,
    (j) a cylinder plate connected to said hollow hub of said second shell section in spaced relation to said shell section,
    (k) a piston slideably mounted on said hollow hub between said cylinder plate and said second shell section,
    (l) first sealing means between said piston and said cylinder plate and
    (m) second sealing means between said piston and said hollow hub to form an enclosed cylinder between said cylinder plate and piston,
    (n) means slideably mounting said piston on said second shell section,
    (o) said piston having a friction facing mounted thereon,
    (p) a multiplicity of spaced springs carried by said piston and in pressure contact with said piston and in pressure contact with said second shell housing and normally urging said friction facing into contact with said friction disc to cause said shell sections and fan blades thereon to rotate,
    (q) means for supplying fluid pressure through said hollow hub of said second shell section and into said enclosed cylinder whereby said piston is moved from said cylinder plate and said friction facing thereon moved out of contact with said friction disc against the urging of said springs whereby said shell portions and fan blades thereon cease to rotate.

11. The device of claim 10 in which said means slideably mounting said piston on said second shell section includes
    (a) multiplicity of spaced pins mounted in said second shell section and slideably extended into
    (b) holes formed in said piston.

* * * * *